United States Patent [19]

Daniels

[11] Patent Number: 5,596,237
[45] Date of Patent: Jan. 21, 1997

[54] GROUND WIRE ATTACHMENT FOR A MOTOR END-SHIELD

[75] Inventor: Nicholas R. Daniels, Dellwood, Mo.

[73] Assignee: Emerson Electric Co., St. Louis, Mo.

[21] Appl. No.: 221,046

[22] Filed: Mar. 31, 1994

[51] Int. Cl.$^6$ .................................................. H02K 11/00
[52] U.S. Cl. ................................................................. 310/71
[58] Field of Search ................................. 310/71; 174/78; 439/810, 811, 812, 815, 491

[56] References Cited

U.S. PATENT DOCUMENTS

| | | | |
|---|---|---|---|
| 3,502,917 | 3/1970 | Bizoe | 310/71 |
| 3,787,795 | 1/1974 | Thompson et al. | 339/14 R |
| 4,015,890 | 4/1977 | Glaesel | 339/113 B |
| 4,629,281 | 12/1986 | Krüger | 339/272 R |
| 5,235,230 | 8/1993 | Yuhi et al. | 310/71 |

FOREIGN PATENT DOCUMENTS

| | | | |
|---|---|---|---|
| 0103550 | 4/1938 | Australia | 439/812 |
| 0678776 | 10/1991 | Switzerland | 439/815 |

Primary Examiner—Thomas M. Dougherty
Assistant Examiner—Jonathan Link
Attorney, Agent, or Firm—Polster, Lieder, Woodruff & Lucchesi

[57] ABSTRACT

An integral ground lug assembly for a dynamoelectric machine in the form of a motor is provided which permits quick attaching for a ground wire. The assembly includes a lug integrally formed with an end-shield of the motor. The lug extends radially from the end-shield and has both an axially extending bore and a radially extending bore which intersect one another. In addition, the lug may incorporate a transverse bore intersecting the axial bore. A clip is received in the axially extending bore and interacts with the bore to prevent movement of the clip relative to the bore. This maintains the clip in place during shipment and thereafter. A fastener extends through the radial bore to press the clip legs together to pinch or hold the ground wire in place. The clip operation within the lug may be varied so that ground wire attachment may be made from a number of directions, depending, for example, on the applicational use of the matter.

25 Claims, 2 Drawing Sheets

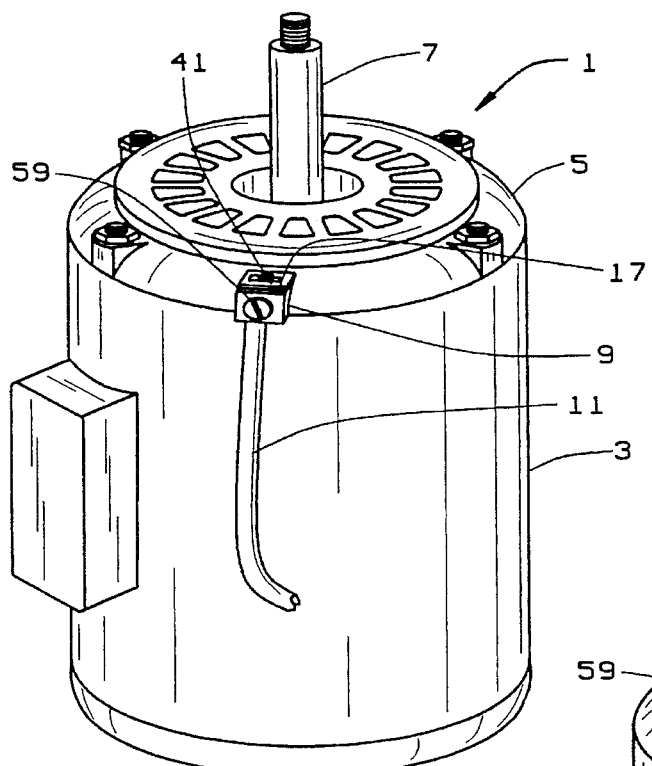
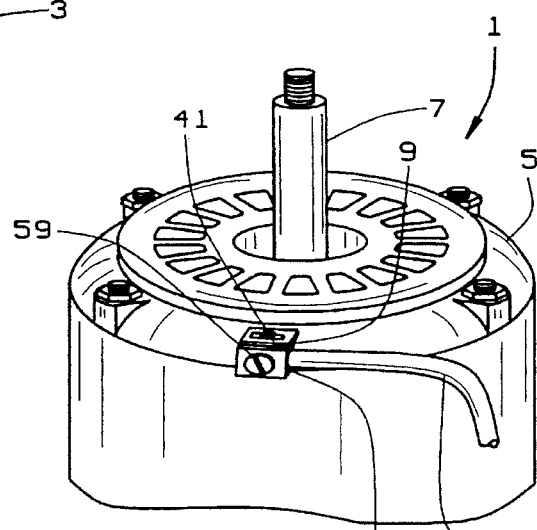
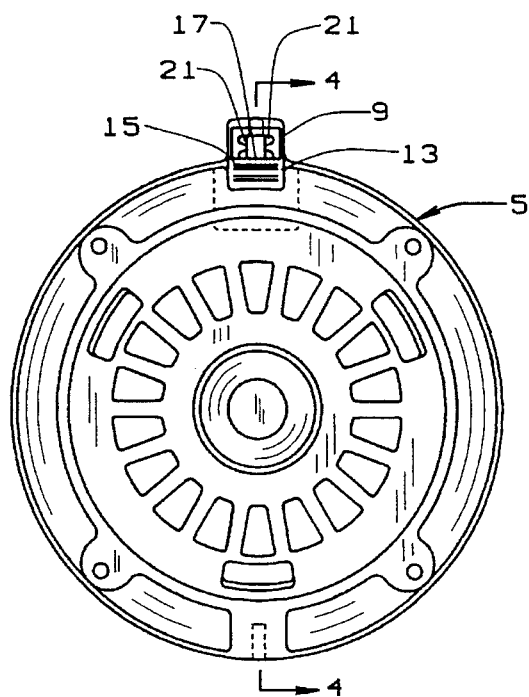
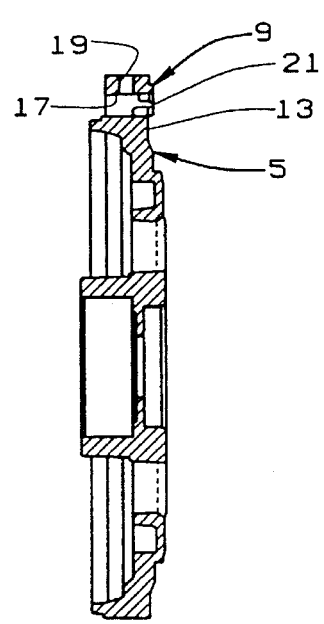
FIG. 1
FIG. 2
FIG. 3
FIG. 4

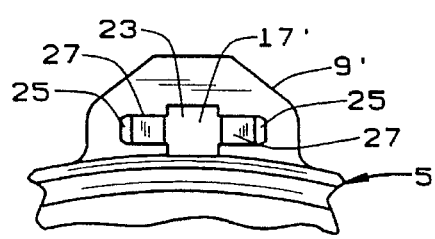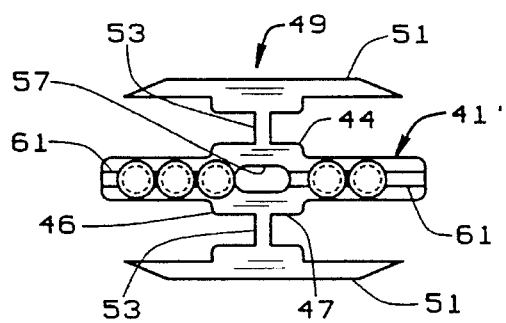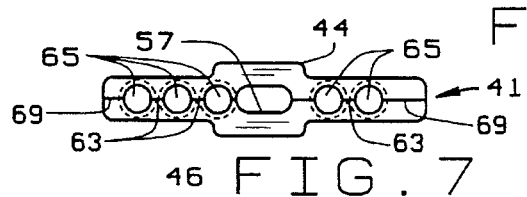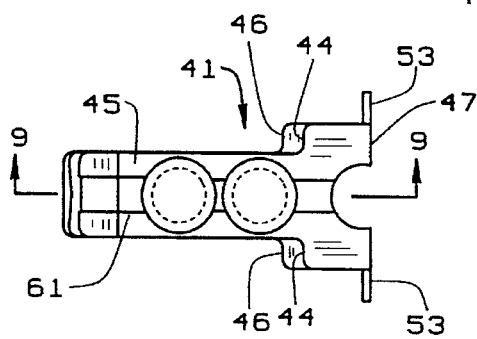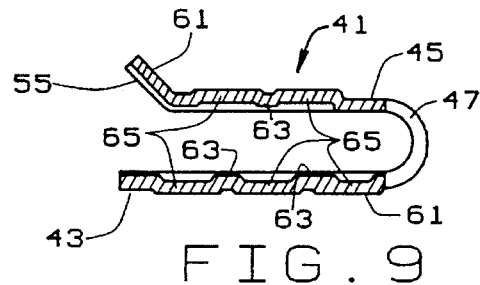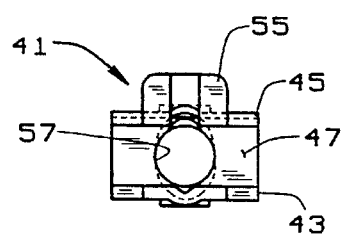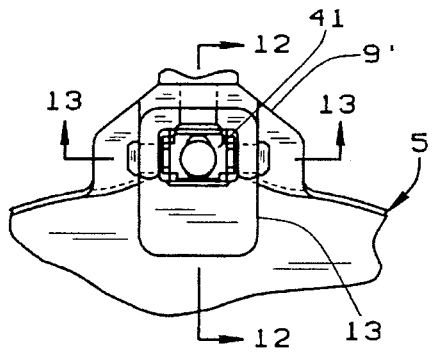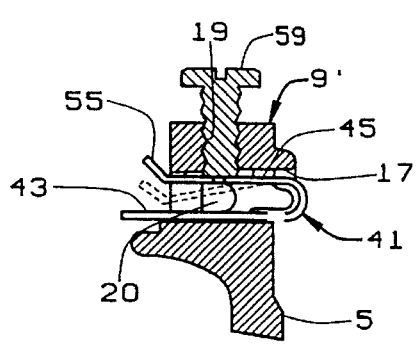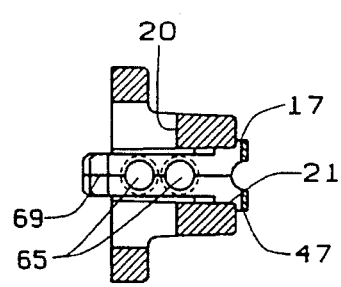

5,596,237

GROUND WIRE ATTACHMENT FOR A MOTOR END-SHIELD

BACKGROUND OF THE INVENTION

This invention relates to electric motors, and, in particular, to an improved manner of securing a ground wire to an end-shield of the motor. Although the invention is described with respect to electric motors, those skilled in the art will recognize the broader applicability of the invention described hereinafter.

Dynamoelectric machines have been grounded in applications since antiquity. Until recently, it has been common to provide a terminal consisting of a strap, clamping hood, and screw which are attached to the motor by a threaded fastener. The grounding wire is attached to the strap with another threaded fastener which generally includes a grounding wire to ground the machine's circuitry. The grounding assembly thus includes four separate parts—the strap, clamping head, and two screws. During shipping, either of the two screws can come loose due to jostling of the machine. If the screw which holds the strap to the end-shield comes loose, the terminal will separate from the end-shield. If the hood screw loosens, the hood can separate from the strap. This creates difficulty for the one who installs the machine into a product because he must find the loose parts and reattach them. It is then desirable to provide a grounding assembly which cannot easily be separated from an end-shield.

SUMMARY OF THE INVENTION

One object of the present invention is to provide a motor having an improved manner of securing a ground wire to it.

Another object is to provide such a motor wherein the ground wire attachment uses a minimum number of separable pieces.

Another object is to provide a terminal and end-shield assembly for the motor in which the terminal cannot be easily removed from the end-shield by simple jostling of the motor, but which may be easily positioned with respect to the end-shield.

Another object is to provide such an end-shield wherein the ground wire may be easily and securely attached to the motor.

Another object of the invention is to provide a ground assembly which accepts a ground wire from a plurality of directions;

Still another object of the invention is to provide a ground assembly which accepts a wide range of solid or stranded wire gauges in performing grounding functions.

These and other objects will become apparent to those skilled in the art in light of the following disclosure and accompanying drawings.

In accordance with the invention, generally stated, an improved manner of securing a ground wire to an electric motor is provided. Conventionally, the motor includes a casing or shell housing a stator and rotor assembly. A rotor shaft extends axially from the rotor and the casing is closed by at least one end-shield. The improvement comprises a lug formed in the end-shield of the motor. The lug has a bore formed in it which extends axially through the lug. A clip is received in the bore to hold the ground wire. The interaction of the clip with the lug prevents the clip from sliding out of the lug without the intervention of a person.

The clip is generally hair-pin shaped and resilient. It has a front leg and a back leg joined by an arched section. The front leg includes an end portion extending away from the back leg. When the clip is received in the bore, the front leg end portion bears against a bottom surface of the lug to prevent movement of the clip with respect to the lug in one direction. The lug also includes an upper surface, spaced from the lug's bottom surface, which interacts with the clip's arched portion to prevent movement of the clip relative to the lug in a second direction. In one embodiment, the lug includes projections which extend inwardly from the wall of the bore. The arched section or web of the clip sits on this projection and is prevented from passing through the bore. The projection is preferably flush with the top of the lug, but can be spaced below the top of the lug. In another embodiment, the lug includes a surface offset or extending from the bore and which is spaced below the top surface of the lug. The clip includes wings or projections which extend outwardly from the clip's arched portion and sit on this surface to prevent the clip from passing through the bore. The mating of the clip wings and the lug projections orient the position of the clip so as to hold the clip in a restrained manner and to prevent rotation of the clip about a centerline parallel to the lug bore. In addition, the depth of the recesses above and below the lug projections insure proper installation and orientation of the clip.

To secure the ground wire in the clip, the legs are urged together by a screw. The screw is received in the lug, through a radial bore which intersects the axial bore. To better hold the wire in place, the clip legs each include spaced apart pegs. The pegs of one leg are preferably offset from the pegs of the other leg. The pegs thus crimp the ground wire when the legs are brought together to secure the ground wire between the legs. The clip also includes a rib which extends down the center of the legs. The rib is positioned such that the screw bears against the rib. During shipping, the screw is set so that it slightly compresses the clip. The resilient nature of the clip will prevent rotational movement of the screw and the screw will thus not come loose from the lug.

The ground wire may be received in the clip in a variety of fashions. It may be received through the bottom of the axial bore to extend up toward the clip arched section. The clip has a hole formed in its arched section and the ground wire may be passed through this hole. Lastly, the lug includes a transverse bore which communicates with the space between the clip legs. The wire may be placed through this transverse bore. No matter how the wire is passed to the area between the legs of the clip, the wire will be securely held in place by the clips pegs.

BRIEF DESCRIPTION OF THE DRAWINGS

FIG. 1 is a perspective view of a dynamoelectric machine including one illustrative embodiment of a ground wire attachment of the present invention, the attachment receiving the ground wire in a generally vertical manner;

FIG. 2 is a view similar to FIG. 1 showing the ground wire attachment means receiving the wire generally transversely;

FIG. 3 is a top plan view of a motor having an end-shield of the present invention to which a ground wire may be easily secured;

FIG. 4 is a cross-sectional view of the end-shield taken along line 4—4 of FIG. 3;

FIG. 5 is an enlarged fragmentary plan view of a second embodiment of the ground wire lug of the end-shield;

FIG. 6 is a plan view of a ground wire clip blank showing what would be the outer surface of a clip of the ground wire attachment;

FIG. 7 is a plan view of the blank showing what would be an inner surface of the clip;

FIG. 8 is a plan view of the clip when formed;

FIG. 9 is a cross-sectional view of the clip;

FIG. 10 is a front elevational view of the clip;

FIG. 11 is a top plan view of the lug of FIG. 5 with the clip received therein;

FIG. 12 is a cross-sectional view taken along line 12—12 of FIG. 11; and

FIG. 13 is a cross-sectional view taken along line 13—13 of FIG. 11, rotated counter-clockwise 90°.

DESCRIPTION OF THE PREFERRED EMBODIMENT

A dynamoelectric machine 1 is shown in FIG. 1. Machine 1 includes a housing or shell 3 in which a rotor and stator assembly (not shown) are mounted. At least one end-shield 5 closes one end of the housing. A rotor shaft 7, which extends axially from the rotor, extends through the end-shield so that the output of the motor may be harnessed by a device such as a washing machine, dryer, fan, etc.

In FIG. 1, end-shield 5 has a block or lug 9. Lug 9 can be formed integrally with the motor end-shield or physically attached to the end-shield. Although the lug is shown being formed with the end-shield, it could also be formed with the motor shell or casing, if desired. A ground wire 11 is secured to block 9 by a clip 41 to connect the dynamoelectric machine to a ground. As will be discussed below, block 9 and clip 41 can receive ground wire 11 either generally vertically, as shown in FIG. 1, or generally transversely, as shown in FIG. 2. In FIG. 3, lug 9 preferably extends radially outwardly from end-shield 5. Radially inwardly of lug 9 and on a top surface of end-shield 5, a surface 13 is provided in which information or indicia 15 may be inscribed or cast. The lug 9 includes an axially extending bore 17 and a radially extending bore 19.

A second embodiment 9' of the lug is shown in FIGS. 5, and 11–13. Lug 9' includes the axial and radial bores 17 and 19, as well as a transverse bore 20 (FIGS. 12 and 13). Transverse bore 20 is generally perpendicular to both the bore 19 and the bore 17. Bore 20 can formed by molding it into the lug or by drilling the hole in the lug.

Bore 17, as shown in FIGS. 3 and 4, is generally rectangular. A pair of oppositely disposed ears 21 extend inwardly from the wall which defines bore 17. As shown in FIG. 5, bore 17' has a generally rectangular center portion 23 and a pair of winged recesses 25. A surface 27 is disposed in each wing 25 below the top surface of lug 9.

A clip 41 (FIG. 9) is received in axial bore 17 (FIG. 12). Clip 41 is generally U-shaped and includes a back leg 43 and a front leg 45 joined by a web 47. Legs 43 and 45 are narrower than web 47, and the transition from the web to the legs define shoulders 44 and 46. Clip 41 is formed from a blank 49 (FIG. 6) from which clip 41 is stamped. After stamping, blank 49 includes an unformed clip 41' which is joined to adjacent clips 51 by strips 53 which extend perpendicularly from web section 47. To form-clip 41, stamped clip 41' is separated from adjacent clips 51 and bent about central portion 47 and a front portion 55 of front leg 45 is bent outwardly, away from back leg 43 and out of the plane of the front leg. (FIG. 9) Leg portion 55 preferably forms an angle of about 45° with the rest of leg 45. Strips 53 may be retained or removed, depending on which bore formation is used.

Clip 41 is resilient and flexible, as shown in phantom in FIG. 12. To insert clip 41 into axial bore 17, legs 43 and 45 are pinched together an amount sufficient to allow portion 55 to pass into and through bore 17. Once through bore 17, clip 41 springs back towards its relaxed position. In this position, front portion 55 extends outwardly from beneath lug 9. Front portion 55 thus creates a stop which interacts with the bottom surface of lug 9 to prevent clip 41 from sliding upwardly out of bore 17. Further, the ears 21 of FIGS. 3 and 4 interfere with web 47 and prevent clip 41 from slipping downwardly though, or rotating in, bore 17, as shown in FIGS. 12 and 13. In the embodiment of FIG. 5, the surfaces 27 provide stops on which clip shoulders 44 and 46 sit or abutt to prevent clip 41 from slipping downwardly through, or rotating in, bore 17. Thus, the clip interacts with the bore to positively locate and retain the clip in bore 17.

Clip 41 includes a hole 57 in web 47 (FIG. 10). In blank 49, hole 57 is preferably elongate. When clip 41 is inserted in slot 17, hole 57 is exposed at the top of the lug 9. Ground wire 11 is passed through axial bore 17, or tansverse bore 20, between clip legs 43 and 45. A screw 59 (FIG. 1) is screwed into radial bore 19 to press legs 43 and 45 together to pinch or hold wire 11 in place. The information or indicia 15 can include a ground symbol and the maximum torque which should be applied to the screw so that the assembler will not damage the clip or lug.

Although wire 11 is shown passing upwardly into axial bore 17 in FIG. 1, it could be passed downwardly through bore 17 through clip hole 57, or transversly through bore 20 which is aligned with the area between the clip legs. (FIG. 2)

A rib 61 is formed on the outer surface of legs 43 and 45. Rib 61 on leg 45 is positioned so that screw 59 contacts rib 61. Rib 61 is provided to add strength to the legs so that the legs can better withstand the pressures applied by the screw to clip 41. Screw 59 thus cannot easily be passed through clip 41 to contact wire 11 where it could mar or cut the wire.

To better hold the wire in place within clip 41, clip legs 43 and 45 are provided with projections 63 on an inner surface of the legs. Projections 63 are defined by depressions 65 formed on the legs inner surface. The projections 63 are positioned to be generally aligned with the depressions 65 (FIG. 9). Thus, the legs are brought together by screw 59, and the projections 63 and depressions 65 will be brought together. They will therefore provide a joggled crimp to wire 11 to positively hold the wire in clip 41.

A groove 69 (FIG. 7) is also provided on the inner surface of the legs. Groove 69 is generally centered with respect to the legs and extends a substantial length of the legs. When the legs are brought together by the screw, the wire is forced toward the groove to center the wire with respect to the legs. This helps in better centering and retaining the wire in the clip 41 and substantially eliminating the possibility that the wire will slip out of the clip while tightening the screw 59.

During shipping, the clip and bore 17 interact, as described above, to prevent the clip from falling out of the bore. The screw 59 is screwed into bore 19 a distance sufficient to slightly push leg 45 towards leg 43. The spring quality or resiliency of the clip will then act against the screw to prevent the screw from turning in bore 19. The screw will thus not loosen and fall out of hole 19 during shipping.

As can be appreciated from the foregoing, the novel lug and clip arrangement described above provides a ground clip which is easily applied to a ground lug and will not slip out of the ground lug during shipping. The assembly, as can be seen, also reduces the parts to a minimum number of separable parts required to hold the ground wire in place. The arrangement can accept a plurality of sizes of wire and can accommodate solid or stranded wire and the wire can be oriented either axially or transversly to the clip.

The above description is set forth for illustrative purposes only. Variations within the scope of the appended claims may be apparent to those skilled in the art. For example, the shape of bores 17 and 20 may be varied in shape and may be formed by machining, casting, or molding processes. Hole 57 in clip 41 could be omitted. The lug could be positioned elsewhere on the motor or end-shield, for example on the motor housing or within the end-shield itself. The lug need not extend radially outwardly of the motor assembly. These examples are merely illustrative.

I claim:

1. A dynamoelectric machine comprising a shell, a stator, and a rotor housed in said shell, at least one end-shield covering one end of said shell, a rotor shaft extending axially from said rotor and being rotatably journaled in said at least one end-shield, the improvement comprising:

a first bore and a second bore formed in one of said shell and end-shield so as to intersect and communicate with each other; and a ground wire retaining clip sized for reception in and received in said first bore, said clip including a front leg and a back leg joined by a web, said web having a hole formed in it, said front and back legs defining a space between them which receives said ground wire, said space being accessible through said first bore from a bottom of said first bore or through said top of said first bore through said web hole and being accessible through two openings of said second bore;

wherein said ground wire can be inserted into said space between said front and back legs from four directions.

2. The improvement of claim 1 wherein said first and second bores are formed along said end-shield.

3. The improvement of claim 2 including clip securing means for preventing movement of said clip relative to said end-shield.

4. The improvement of claim 3 wherein said end shield includes a first surface, said front leg including an end portion extending outwardly from the plane of said front leg; said front leg end portion defining at least a portion of said clip securing means, said front leg end portion bearing against the first surface of said end-shield to prevent movement of said clip with respect to said end-shield in at least one direction.

5. The improvement of claim 4 wherein said clip securing means further includes a second surface on said end-shield which interacts with said clip web to prevent movement of said clip relative to said end-shield in a second direction, said second surface being spaced from said first surface.

6. The improvement of claim 5 wherein said clip securing means includes an inwardly extending projection on a wall of said first bore, said projection interfering with said clip web to prevent movement of said clip in said second direction.

7. The improvement of claim 1 wherein said lug includes a third bore communicating with said first bore, said third bore receiving a fastener, said fastener, when tightened, bearing down on said front leg, pinching said legs together, to hold said wire between said legs.

8. The improvement of claim 7 wherein said clip legs each include spaced apart projections, the projections of one leg being offset from the projections of the other leg, said projections crimping said ground wire when said legs are brought together to secure said ground wire between said legs.

9. The improvement of claim 7 including means for longitudinally centering said wire in said clip.

10. The improvement of claim 9 wherein said centering means includes a groove on an inner surface of each clip leg; said grooves extending substantially the full length of said legs and being substantially longitudinally centered with respect to said legs, wherein when said legs are urged together by said fastener, said wire is urged into said groove.

11. The improvement of claim 7 wherein said first bore extends axially relative to said motor, said second bore extends transversely relative to said motor, and said third bore extends radially relative to said motor.

12. The improvement of claim 11 wherein said bores are formed in a lug extending radially from said end-shield.

13. The improvement of claim 7 wherein said lug includes indicia indicative of the maximum force which can be exerted by said fastener to secure said wire in said clip.

14. The improvement of claim 7 including a rib on an outer surface of said front leg, said rib being positioned such that said fastener bears down on said rib when said fastener is tightened.

15. A dynamoelectric machine comprising a shell, a stator, and a rotor housed in said shell, at least one end-shield covering one end of said shell, a rotor shaft extending axially from said rotor and being rotatably journaled in said at least one end-shield, the improvement comprising:

a lug on said dynamoelectric machine, said lug defining a bore extending therethrough;

a ground wire retaining clip which is received in said lug bore, said clip having a front leg and a back leg joined by a web, said front leg including an end portion extending outwardly from the plane of said front leg; and clip securing means for preventing movement of said clip relative to said lug in a first direction and a second direction; said means for preventing movement of said clip in said first direction including said front leg end portion, said front leg end portion bearing against a first surface of said lug to prevent movement of said clip with respect to said lug in said first direction; said means for preventing movement of said clip in said second direction including a second surface on said lug which interacts with said clip web to prevent movement of said clip relative to said lug in said second direction, said second surface being spaced from said first surface; said lug bore including two inwardly extending projections, said projections extending from opposite sides of said lug bore toward each other said projections interfering with said clip web to prevent movement of said clip in said second direction.

16. A dynamoelectric machine comprising a shell, a stator, and a rotor housed in said shell, at least one end-shield covering one end of said shell, a rotor shaft extending axially from said rotor and being rotatably journaled in said at least one end-shield, the improvement comprising:

a lug on said dynamoelectric machine, said lug defining a bore extending therethrough:

a ground wire retaining clip which is received in said lug bore, said clip having a front leg and a back leg joined by a web, said front leg including an end portion extending outwardly from the plane of said front leg; and clip securing means for preventing movement of said clip relative to said lug in a first direction and a second direction; said means for preventing movement of said clip in said first direction including said front leg end portion, said front leg end portion bearing against a first surface of said lug to prevent movement of said clip with respect to said lug in said first direction; said means for preventing movement of said clip in said second direction including a second surface on said lug which interacts with said clip web to prevent movement of said clip relative to said lug in said second direction, said second surface being spaced from said first surface; said bore including an outwardly directed extension defining at least a part of said second surface, said clip including a shoulder which rests on said surface to prevent movement of said clip in said second direction, said clip legs being narrower than said clip web, the transition from said web to said legs defining said shoulder.

17. In combination, an end-shield for a motor assembly and a clip which secures a ground wire to the end-shield;

the end-shield including a bore extending axially therethrough, said clip being received in said bore, said clip including a front leg and a back leg joined by a web, said ground wire being received between said clip legs; each said clip leg defining a substantially straight groove extending substantially the full length of each said leg and being generally centered along said leg, the grooves of said legs being substantially aligned with each other, wherein when said legs are urged together by said fastener, said wire is urged into said leg grooves;

said clip from leg including an end portion extending away from said back leg; said front leg end portion bearing against a first surface of said end-shield to prevent axial movement of said clip with respect to said end-shield in a first direction;

said end-shield including a second surface which interacts with said clip web to prevent movement of said clip relative to said end-shield in a second direction, said second surface being spaced from said first surface, said end-shield second surface including an inwardly extending projection on a wall of said bore, said projection interfering with said clip web to prevent movement of said clip in said second direction.

18. The combination of claim 17 wherein said end-shield includes a radial bore communicating with said first bore, said radial bore receiving a fastener, said fastener, when tightened, bearing down on one of said legs and pinching said legs together, to hold said wire between said legs.

19. The combination of claim 18 wherein said clip legs each include spaced apart projections, the projections of one leg being offset from the projections of the other leg, said projections crimping said ground wire when said legs are brought together to secure said ground wire between said legs.

20. The combination of claim 19 wherein the projections of one leg are axially spaced from the projections of the other leg.

21. The combination of claim 17 wherein said bore includes a central section which receives said clip and opposing wing sections, said opposing wing sections each defining said second surface, said clip including oppositely disposed strips, said second surfaces interfering with said clip strips to prevent axial movement of said clip in said second direction.

22. The combination of claim 21 wherein said second surface is spaced from a top surface of said end-shield.

23. The improvement of claim 22 wherein the ground wire attachment structure is on said end shield.

24. In a dynamoelectric machine including a shell and an end shield defining an enclosure for said dynamoelectric machine and a ground wire associated with said dynamoelectric machine, the improvement comprising a ground wire attachment structure associated with said enclosure, said ground wire attachment structure comprising a housing having a first channel and a second channel formed in it, said channels intersecting each other, at least one of said first and second channels having a pair of entrances, a ground wire receiving clip sized for reception in one of said first and second channels, said clip being positioned along the intersection of said channels so as to receive said ground wire from any of said channels, said ground wire being insertable into said clip through the entrances of said channels, and a fastener movably mounted to said housing to hold said ground wire in said clip.

25. The improvement of claim 24 wherein the ground wire attachment structure is integrally formed with said end shield.

* * * * *